United States Patent
Daboussi

(10) Patent No.: US 7,492,130 B2
(45) Date of Patent: Feb. 17, 2009

(54) POWER PROCESSING UNIT AND RELATED METHOD FOR REGULATING A VOLTAGE DESPITE VOLTAGE FLUCTUATIONS ACROSS AN ENERGY STORAGE DEVICE

(75) Inventor: Zaher Daboussi, Arcadia, CA (US)

(73) Assignee: AeroVironment, Inc., Monrovia, CA (US)

(*) Notice: Subject to any disclaimer, the term of this patent is extended or adjusted under 35 U.S.C. 154(b) by 0 days.

(21) Appl. No.: 11/853,664

(22) Filed: Sep. 11, 2007

(65) Prior Publication Data
US 2008/0018308 A1  Jan. 24, 2008

Related U.S. Application Data

(62) Division of application No. 11/098,778, filed on Apr. 4, 2005, now Pat. No. 7,436,150.

(51) Int. Cl.
*H01M 10/44* (2006.01)
(52) U.S. Cl. ....................... 320/166
(58) Field of Classification Search ............ 320/141, 320/166, 167; 363/16
See application file for complete search history.

(56) References Cited

U.S. PATENT DOCUMENTS

| | | | |
|---|---|---|---|
| 5,528,121 A | 6/1996 | Okamura | |
| 5,572,108 A | 11/1996 | Windes | |
| 5,731,694 A | 3/1998 | Wilcox et al. | |
| 5,734,258 A | 3/1998 | Esser | |
| 6,163,142 A | 12/2000 | Tsujimoto | |
| 6,265,851 B1 | 7/2001 | Brien et al. | |
| 6,268,666 B1 | 7/2001 | Bhowmik | |
| 6,310,789 B1 | 10/2001 | Nebrigic et al. | |
| 6,370,046 B1 | 4/2002 | Nebrigic et al. | |
| 6,373,152 B1 | 4/2002 | Wang et al. | |
| 6,541,942 B1 | 4/2003 | Francis | |
| 2001/0033501 A1 | 10/2001 | Nebrigic | |
| 2002/0118551 A1* | 8/2002 | Ishii et al. ............. | 363/16 |
| 2003/0011346 A1 | 1/2003 | Staib et al. | |

(Continued)

FOREIGN PATENT DOCUMENTS

EP  1 033 730  9/2000

(Continued)

OTHER PUBLICATIONS

Schupbach, R. M. et al., "Comparing DC-DC converters for power management in hybrid electric vehicles," Electric Machines and Drives Conference, 2003, IEMDC '03, IEEE International, Jun. 2003, vol. 3, pp. 1369-1374.

(Continued)

*Primary Examiner*—Edward Tso
(74) *Attorney, Agent, or Firm*—Sheppard, Mullin, Richter & Hampton LLP

(57) ABSTRACT

An apparatus including an energy storage device and a power processing unit that is coupled to the energy storage device. The energy storage device is configured to deliver electrical energy to a load. The energy storage device also is configured to receive electrical energy from a source. The power processing unit is configured to control a fluctuation in voltage across the energy storage device while electrical energy is received by the energy storage device, or while electrical energy is delivered from the energy storage device to the load.

22 Claims, 7 Drawing Sheets

U.S. PATENT DOCUMENTS

| | | |
|---|---|---|
| 2003/0044689 A1 | 3/2003 | Miyazaki et al. |
| 2003/0067281 A1 | 4/2003 | Wilk et al. |
| 2003/0067735 A1 | 4/2003 | Wilk et al. |
| 2003/0087615 A1 | 5/2003 | Randall |

FOREIGN PATENT DOCUMENTS

| | | |
|---|---|---|
| EP | 1 248 345 | 10/2002 |
| EP | 1 366 948 | 12/2003 |
| JP | 2000295715 | 10/2000 |
| WO | WO 03 100939 | 12/2003 |

OTHER PUBLICATIONS

Caricchi, R., et al., "20 kW water-cooled prototype of a buck-boost directional DC-DC converter topology for electrical vehicle motor drives," Applied Power Electronics Conference and Exposition, 1995, APEC '95, Conference Proceedings, Mar. 1995, pp. 887-892.

* cited by examiner $IL\_ref(t) = Kvp * \text{Voltage Error}(t) + Kvi * \int \text{Voltage Error}(t)\, dt$ $D(t) = Kcp * \text{Current Error}(t) + Kci * \int \text{Current Error}(t)\, dt$

POWER PROCESSING UNIT AND RELATED METHOD FOR REGULATING A VOLTAGE DESPITE VOLTAGE FLUCTUATIONS ACROSS AN ENERGY STORAGE DEVICE

CROSS-REFERENCE TO RELATED APPLICATIONS

This is a division of pending Application No. 11/098,778, filed Apr. 4, 2005.

BACKGROUND OF THE INVENTION

1. Field of the Invention

The invention relates generally to the field of energy storage. More specifically, the invention relates to an energy storage apparatus for storing electrical energy.

2. Description of the Related Art

Recently, ultracapacitors have become popular for the storage of electrical energy, because ultracapacitors can provide high levels of capacitance, e.g., 3,000 farads ("F"), with high output current, e.g., 500 Amperes. These high levels of capacitance are facilitated by the small spacing between the electrodes of the ultracapacitor, which can be less than a few nanometers.

When compared with electrochemical storage devices, i.e., batteries, ultracapacitors offer significant advantages. For example, ultracapacitors can provide ten to thirty times the cycle life of batteries. Also, ultracapacitors require less maintenance than batteries, are more efficient than batteries, and are easier to manufacture, and therefore, cheaper to produce, than batteries. In addition, ultracapacitors are more environmentally friendly to manufacture and to dispose of than batteries, because ultracapacitors lack many of the environmentally damaging materials, e.g., lead, nickel, cadmium, and mercury, that are included in batteries.

Furthermore, ultracapacitors can be configured in parallel, as well as, in series, thus, providing more energy storage capacity and high current capability. On the other hand, batteries are more difficult to configure in parallel, especially at the module level, due to circulating currents that are created between battery modules that are connected in parallel. Also, it is difficult to provide balanced charging to the battery modules that are connected in parallel.

Despite these advantages, ultracapacitors are still inferior to batteries in terms of their specific energy and energy density. For example, when compared to lead-acid batteries, a widely used battery chemistry with a typical specific energy of 20 Watt hour/kilogram ("Wh/kg"), the specific energy of ultracapacitors are still about one fourth that of lead-acid batteries, i.e., approximately 5 Wh/kg. Also, the voltages for ultracapacitors have remained low, typically about 2.5 V.

The energy stored in an ultracapacitor is given in the following equation:

$$E = \frac{1}{2} C^* V^2$$

where:

E=energy in Watt-hours,
C=capacitance of the ultracapacitor in farads, and
V=the voltage across the terminals of the ultracapacitor in volts.

By doubling the voltage across the ultracapacitor's terminals, the energy stored in the ultracapacitor is quadrupled. This increase in the value of the voltage across the ultracapacitor's terminals will lead to a specific energy of approximately 20 Wh/kg, assuming that the subsequent increase in the mass of the resulting ultracapacitor is small. Such improvements will bring the specific energy of the ultracapacitors very close to that of typically lead-acid batteries.

A clear limitation associated with ultracapacitors is that as the energy stored in the ultracapacitor is used, the voltage across the ultracapacitor's terminals decreases in value. This is evident from the above equation, and the curve depicted in FIG. 1, which shows the decrease in the value of the voltage across an ultracapacitor's electrodes as a function of the amount of energy delivered by the ultracapacitor. For instance, when 75% of the energy stored in the ultracapacitor has been used, the voltage across the ultracapacitor decreases to half its initial value. Since a significant portion of the electrical energy stored in an ultracapacitor must be used in order to achieve a high specific energy, the voltage across the terminals of an ultracapacitor must substantially decrease in value over time. For most applications, such a fluctuation in voltage is significant and undesirable. It should, therefore, be appreciated that there is a need for an efficient device that maintains the voltage across an ultracapacitor while the electrical energy is output from the ultracapacitors. The present invention satisfies this need.

SUMMARY OF THE INVENTION

Embodiments of the present invention include a device that maintains the voltage across an energy storage device during the discharge of electrical energy from the energy storage device. An exemplary embodiment of the present invention is an apparatus including an energy storage device and a power processing unit, which is coupled to the energy storage device. The energy storage device is configured to deliver electrical energy to a load. The energy storage device also is configured to receive electrical energy from a source. The power processing unit is configured to control a fluctuation in voltage across the energy storage device while electrical energy is received by the energy storage device, or while electrical energy is delivered from the energy storage device to the load.

In other, more detailed features of the invention, the apparatus further includes an energy management unit, which is coupled to the energy storage device. The energy management unit can include a balancing element, which is coupled to the energy storage device. The balancing element can be a resistor or a resistor coupled to a switch. The energy management unit can further include an amplifier having an input, which is coupled to the balancing element, and a output; and a controller having an input, which is coupled to the amplifier's output, and an output coupled to the power processing unit.

In other, more detailed features of the invention, the energy storage device is a capacitor, for example, an ultracapacitor. The capacitor can include a first lead and a second lead, the power processing unit can include a first terminal and a second terminal, and the power processing unit can include a switching module. The switching module can include an inductor having a first lead and a second lead, a first switch, which is coupled between the inductor's first lead and the capacitor's first lead, a second switch, which is coupled between the inductor's first lead and the capacitor's second lead, a third switch, which is coupled between the inductor's second lead and the power processing unit's first terminal, and a fourth switch, which is coupled between the inductor's second lead and the power processing unit's second terminal.

In other, more detailed features of the invention, the power processing unit further includes a control module, which is coupled to the switching module. The control module includes a first adder, a voltage regulator, a second adder, a current regulator, and a pulse generator. The first adder has a first input, a second input, and an output. The voltage regulator has an input, which is coupled to the first adder's output, and an output. The second adder has a first input, which is coupled to the voltage regulator's output, a second input, and an output. The current regulator has an input, which is coupled to the second adder's output, and an output. The pulse generator has an input, which is coupled to the current regulator's output, and a first output, a second output, a third output, and a fourth output.

In other, more detailed features of the invention, a reference voltage is coupled into the first adder's first input. Also, a voltage that corresponds to the voltage measured across the power processing unit's first and second terminals is coupled into the first adder's second input. In addition, a voltage that corresponds to an amount of current flowing through the inductor is coupled into the second adder's second input.

In other, more detailed features of the invention, the pulse generator's first output is coupled to the first switch, the pulse generator's second output is coupled to the second switch, the pulse generator's third output is coupled to the third switch, and the pulse generator's fourth output is coupled to the fourth switch. Also, the pulse generator generates a switch control signal, which is coupled into one switch of the first, second, third, and fourth switches; and the switch control signal enables the flow of a current through the one switch.

Another exemplary embodiment of the invention is a power processing unit configured to control a fluctuation in voltage across an energy storage device as electrical energy is received by the energy storage device, or as electrical energy is delivered from the energy storage device to a load. The power processing unit includes a switching module and a control module. The switching modules includes an inductor and a plurality of switches coupled to the inductor. The control module includes a pulse generator, which is coupled to the plurality of switches.

An exemplary method according to the invention is a method for controlling the fluctuation in voltage across an energy storage device as electrical energy is received by the energy storage device, or as electrical energy is delivered from the energy storage device to a load. The method includes providing an energy storage device, providing a power processing unit coupled to the energy storage device, and using the power processing unit to control the fluctuation in voltage across the energy storage device as electrical energy is received by the energy storage device, or as electrical energy is delivered from the energy storage device to a load.

In other, more detailed features of the invention, the energy storage device is a capacitor, and the power processing unit includes a switching module, which is coupled to the capacitor; and a control module, which is coupled to the switching module. The switching module can include a plurality of switches. The method can further including using the switching module to generate a switch control signal, coupling the switch control signal into one of the plurality of switches, and using the switch control signal to control the one of the plurality of switches.

Other features of the invention should become apparent from the following description of the preferred embodiments taken in conjunction with the accompanying drawings, which illustrate, by way of example, the principles of the invention.

DETAILED DESCRIPTION OF THE PREFERRED EMBODIMENTS

Figure 1:
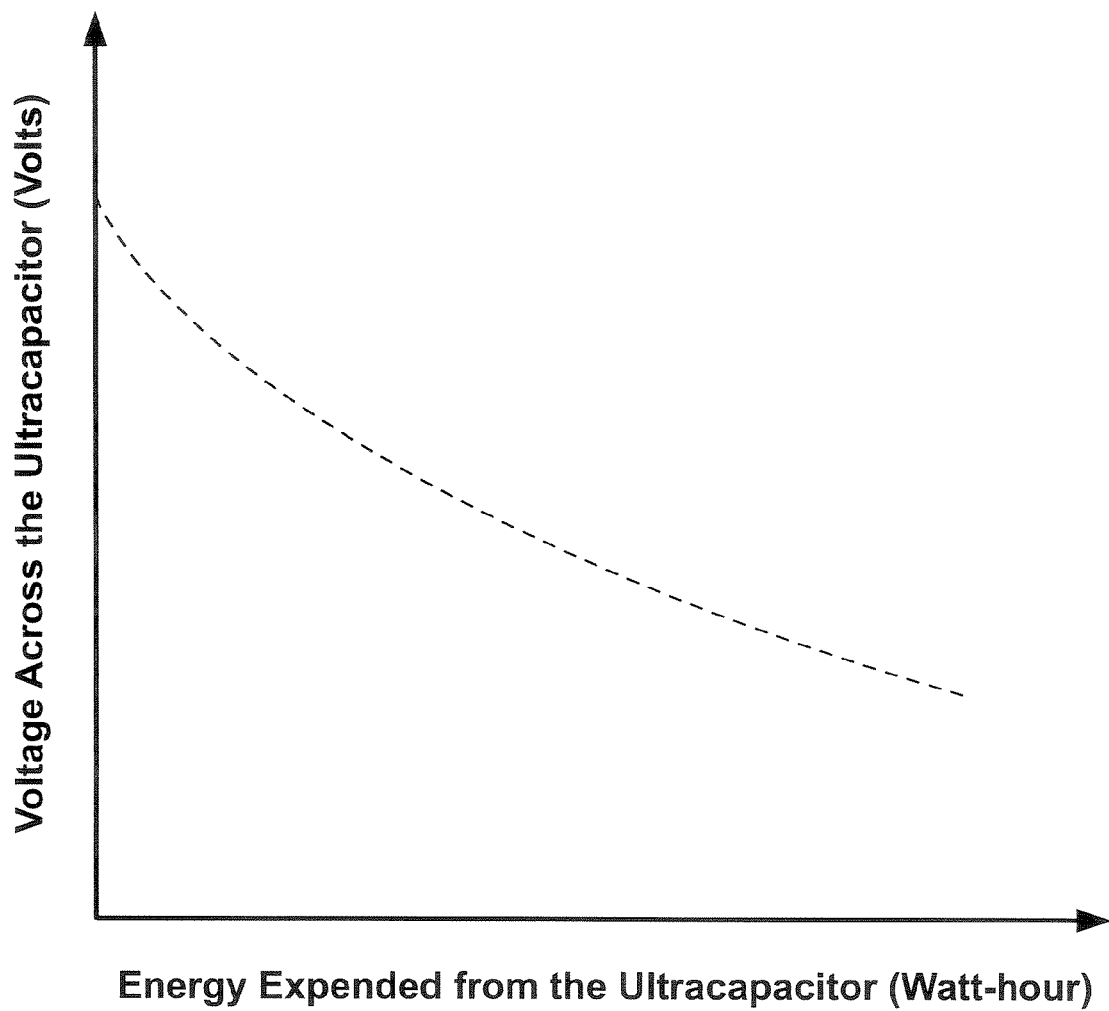
FIG. 1 is a graph of an ultracapacitor's output voltage as a function of the energy output from the ultracapacitor.
Figure 2:
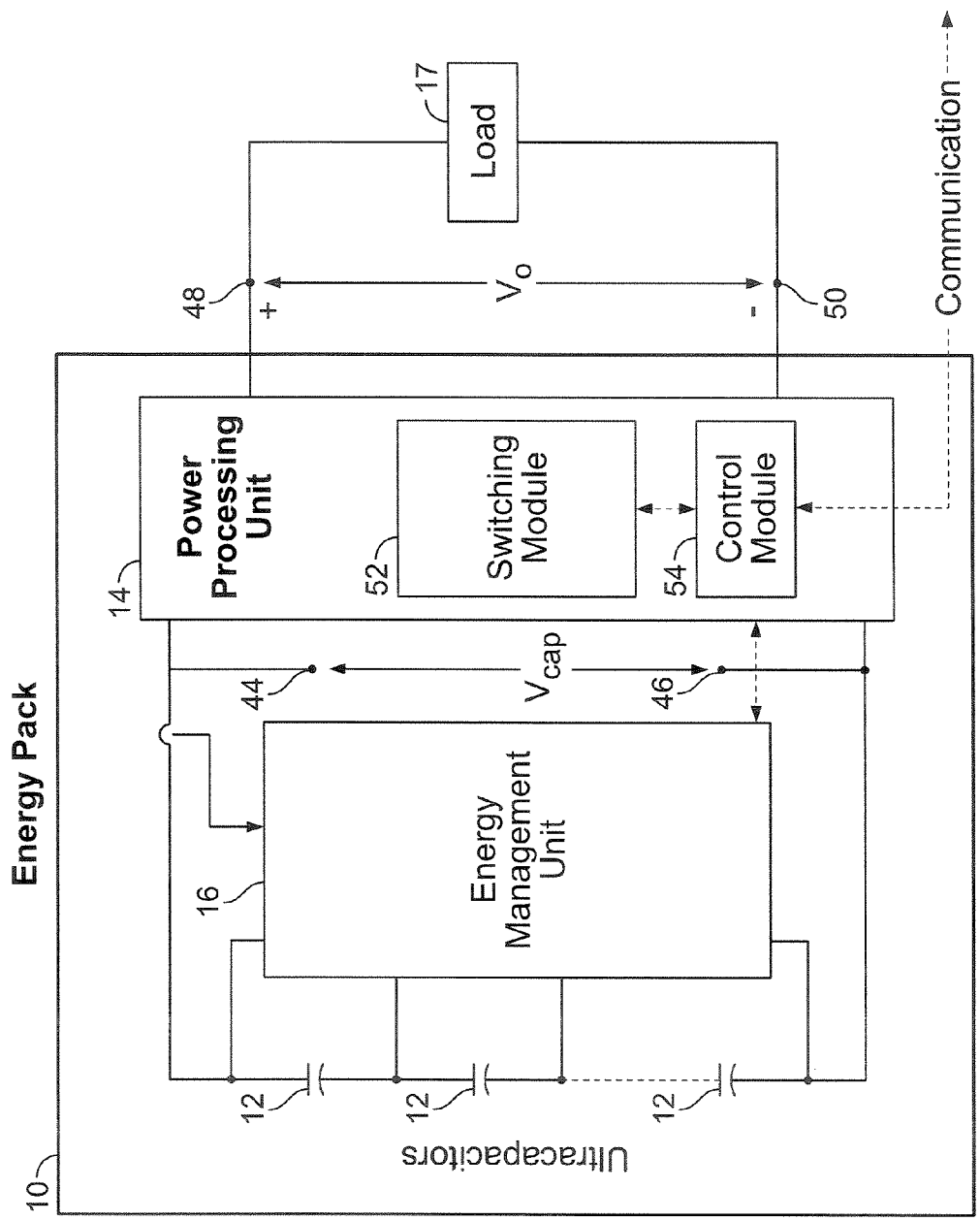
FIG. 2 is a block diagram of an ultracapacitor-based energy pack according to a preferred embodiment.

With reference now to the illustrative drawings, and particularly to FIG. 2, there is shown an energy storage device ("energy pack") 10 that includes a plurality of serially connected ultracapacitors 12, which collectively are coupled in parallel with a high-efficiency and high-power density power processing unit ("power processing unit") 14, and an energy management unit 16. The power processing unit, as discussed below, is configured to control a fluctuation in voltage across the power processing unit as electrical energy is delivered to the plurality of ultracapacitors, or electrical energy is output from the plurality of ultracapacitors to a load 17, or the like. While this detailed description focuses on an energy pack that includes ultracapacitors, one having ordinary skill in the art will recognize that other types of energy storage devices that are configured to store electrical energy, for example, capacitors other than ultracapacitors, e.g., electrostatic capacitors and electrolytic capacitors, can be used in the energy pack of the present invention. Also, while a plurality of ultracapacitors are shown in FIG. 2, the number of ultracapacitors can be as small as one.

An example of an ultracapacitor 12 that can be used in energy pack 10 is the ESHSP-5000C0-002R7 ultracapacitor manufactured by NESSCAP located in Kyonggi-Do, Korea. The capacitance value of each of the ultracapacitors included in the energy pack can range from approximately 1500 F to approximately 5000 F.

Figure 3:
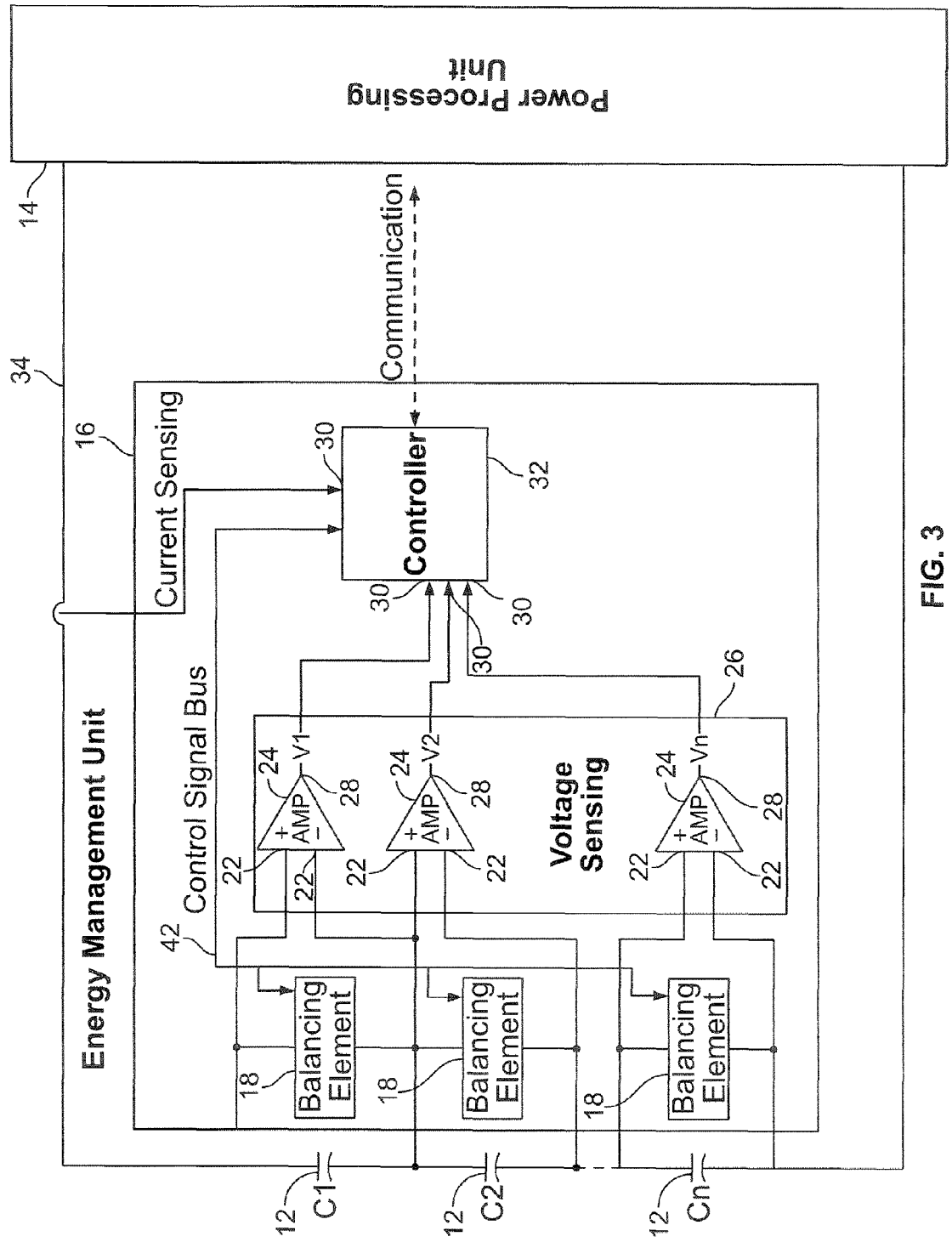
FIG. 3 is a block diagram of a plurality of ultracapacitors, an energy management unit, and a power processing unit, which are included in the ultracapacitor-based energy pack of FIG. 2.
Figure 4:
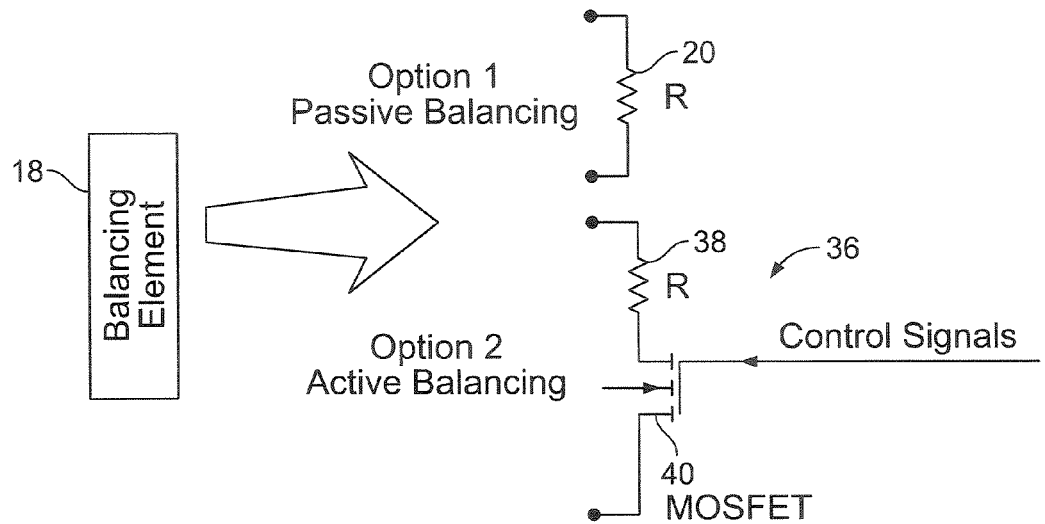
FIG. 4 is a schematic diagram of balancing elements included in the energy management unit of FIG. 3.

Referring additionally to FIGS. 3 and 4, the energy management unit 16 includes a plurality of balancing elements 18, e.g., balancing resistors 20, which are coupled in parallel across each ultracapacitor 12. A balancing element is coupled across each ultracapacitor to ensure that equal voltage values exist across each of the ultracapacitors. Those having ordinary skill in the art will understand that, typically, any 50 mW to 100 mW resistor can be used as a balancing resistor in the energy pack 10.

The voltage value across each ultracapacitor 12 and it associated balancing element 18 is coupled into the inputs 22 of an amplifier 24, which is included in a voltage sensing circuit 26. The voltage value, i.e., V1-Vn, at the output 28 of each amplifier is coupled into an input 30 of a controller 32, which also is included in the energy management unit. In addition to receiving the voltage signals output from each of the amplifiers, the controller receives a voltage signal that corresponds to the current flowing between the power processing unit 14 and the plurality of ultracapacitors. The current flowing between the power processing unit and the plurality of ultracapacitors can be sensed by a current probe (not shown), which is coupled to a lead 34 between the ultracapacitors and the power processing unit. The current probe generates the voltage signal that corresponds to the current flowing between the power processing unit and the plurality of ultracapacitors. The controller is coupled to the power processing unit and is configured to communicate to the power processing unit the voltage values output from each amplifier and the voltage signal that corresponds to the current flowing between the power processing unit and the plurality of ultracapacitors.

In additional embodiments, the balancing elements 18 can be active resistive elements 36 instead of passive resistors 20. In this embodiment, each balancing element includes a balancing resistor 38 coupled in series with a switch 40, e.g., a MOSFET device. The controller 30 also outputs control signals, via a control signal bus 42, which are input to each balancing element. The control signals control the operation of the switch, and thus, determine whether current flows through the balancing resistor included in each balancing element. Advantageously, an active resistive element can be used to limit the discharge rate of the ultracapacitors 12. Also, when needed, the active resistive element can be activated to balance its associated ultracapacitor relative to other ultracapacitors included in the energy pack 10, and the active resistive element can be deactivated when balancing of the ultracapacitor is not required.

Referring again to FIG. 2, the voltage potential, Vcap, across the serially connected ultracapacitors 12 can be measured across a first ultracapacitor terminal 44 and a second ultracapacitor terminal 46. Also, the voltage potential across the energy pack 10, Vo, can be measured across an energy pack first terminal 48, also referred to as the power processing unit's first terminal, and an energy pack second terminal 50, also referred to as the power processing unit's second terminal. The voltage across the energy pack first and second terminals also is the voltage across a load 17, when the load is coupled to the energy pack.

Figure 5:
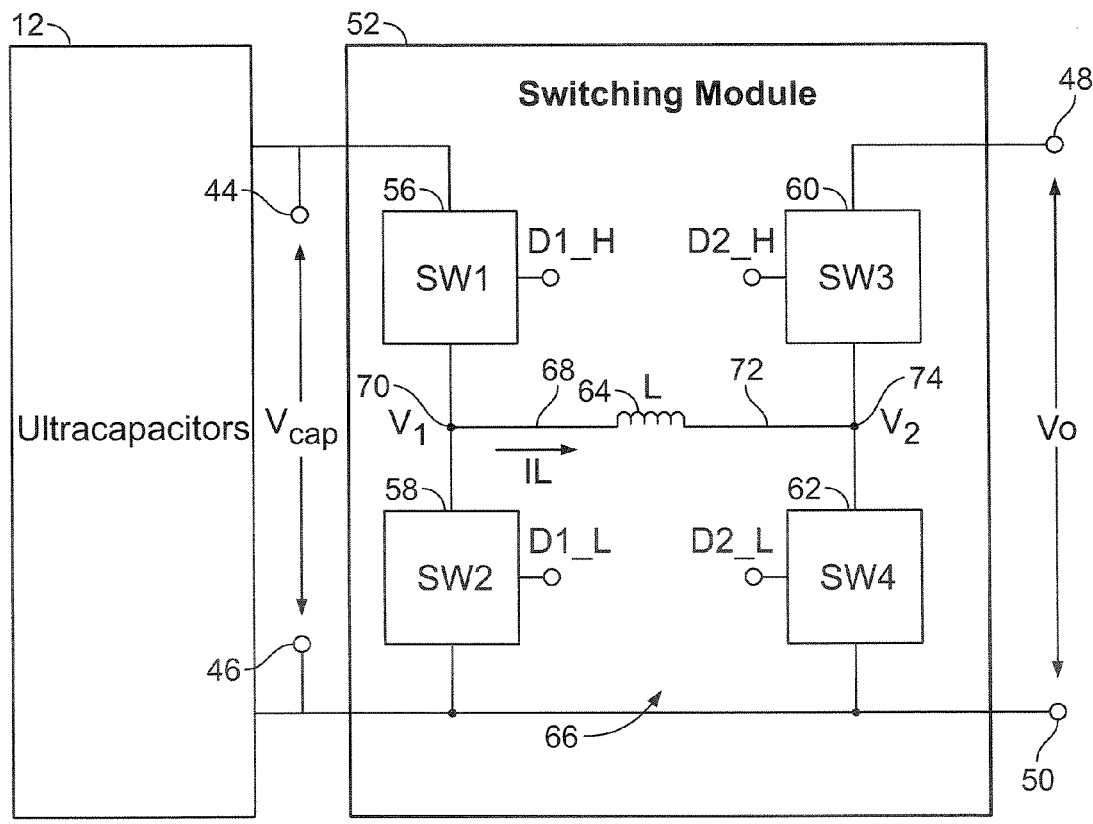
FIG. 5 is a block diagram of a switching module in combination with ultracapacitors included in the ultracapacitor-based energy pack of FIG. 2.
Figure 6:
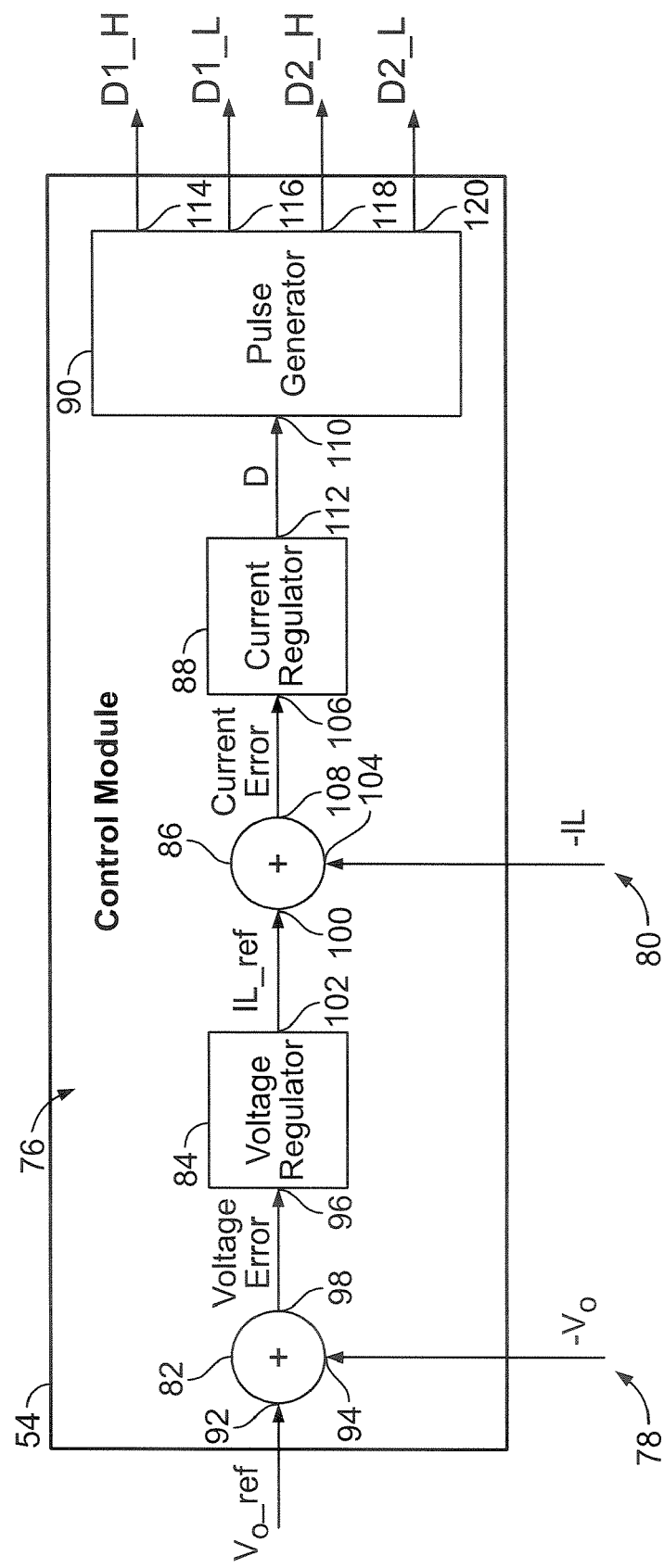
FIG. 6 is a block diagram of a control module included in the ultracapacitor-based energy pack of FIG. 2.

Referring additionally to FIGS. 5 and 6, the power processing unit 14 includes a switching module 52 and a control module 54. The switching module is coupled in parallel with the plurality of ultracapacitors 12. The switching module includes four switches, a first switch SW1 56, a second switch SW2 58, a third switch SW3 60, and a fourth switch SW4 62, and an inductor 64 connected in an H-bridge configuration 66. The four switches can be, for example, bipolar junction transistors (not shown) or MOSFET devices (not shown). An example switch is the CM400DU-12F manufactured by Powerex of Tokyo, Japan. Typically, the inductor is a custom made component.

As illustrated in FIG. 5, the first and second switches 56 and 58, respectively, are coupled in series between the first and second ultracapacitor terminals 44 and 46, respectively. Similarly, the third and fourth switches 60 and 62, respectively, are coupled in series between the energy pack's first and second terminals 48 and 50, respectively. Also, a first lead 68 of the inductor 64 is coupled to a first node 70 located between the first and second switches, which has a first voltage potential value, V1. The second lead 72 of the inductor is coupled to a second node 74 located between the third and fourth switches, which has a second voltage potential value, V2. Each of the four switches included in the switching module is controlled by a switch control signal, D1_H, D1_L, D2_H, and D2_L, respectively, that is generated by the power processing unit's control module 54, as discussed below.

During operation of the switching module 52, when a switch control signal, D1_H, D1_L, D2_H, or D2_L, has an amplitude of approximately 8 volts, the switch 56-62 that receives that signal is ON, and thus, enables the flow of current through that switch. More specifically, when D1_H is high, i.e., D1_H is at least approximately 8 volts, the first switch 56 is ON, enabling the flow of current through the first switch. Correspondingly, when D1_L is high, i.e., D1_L is at least approximately 8 volts, the second switch 58 is ON, enabling the flow of current through the second switch. When D2_H is high, i.e., D2_H is at least approximately 8 volts, the third switch 60 is ON, enabling the flow of current through the third switch. When D2_L is high, i.e., D2_L is at least approximately 8 volts, the fourth switch 62 is ON, enabling the flow of current through the fourth switch.

Alternatively, when the amplitude of a switch control signal is less than approximately 5 volts, the switch 56-62 that receives that switch control signal is OFF, disabling the flow of current through that switch. Thus, when D1_H is low, i.e., D1_H is less than approximately 5 volts, the first switch 56 is OFF, disabling the flow of current through the first switch. Correspondingly, when D1_L is low, i. e., D_L is less than approximately 5 volts, the second switch 58 is OFF, disabling the flow of current through the second switch. When D2_H is low, i.e., D2_H is less than approximately 5 volts, the third switch 60 is OFF, disabling the flow of current through the third switch. When D2_L is low, i.e., D2_L is less than approximately 5 volts, the fourth switch 62 is OFF, disabling the flow of current through the fourth switch.

Depending upon the voltage value across the ultracapacitors, Vcap, relative to the output voltage, Vo, a buck or a boost mode of operation is performed by the switching module 52. If the voltage across the ultracapacitors is greater than, or equal to, the output voltage, then the switching module operates in a buck mode, where power is supplied from the ultracapacitors 12, through the switching module, and to a load 17 that is coupled to the energy pack 10. Alternatively, if the voltage across the ultracapacitors is less than the output voltage, then the switching module operates in a boost mode, where power is supplied to the ultracapacitors via the switching module.

When the switching module 52 operates in buck mode, the fourth switch 62 is OFF, the third switch 60 is ON, and the first and second switches 56 and 58, respectively, are modulated by the control module 54 in order to regulate the value of the output voltage, Vo. When the switching module operates in boost mode, the second switch is OFF, the first switch is ON, and the third and fourth switches are modulated by the control module in order to regulate the output voltage.

The relationship between the voltage across the ultracapacitor first and second terminals 44 and 46, respectively, Vcap, and the voltage across the energy pack's first and second terminals 48 and 50, respectively, Vo, is given by the following equation:

$$Vo = D1/D2 * Vcap$$

where:
  Vo equals the voltage across the energy pack's first and second terminals.
  D1 is the duty cycle of the first switch 56 during the buck mode of operation, and D1 is allowed to vary between 0 and 1. During the boost mode of operation D1 is equal to 1, which corresponds to an ON device.
  D2 is the duty cycle of the third switch 60 during the boost mode of operation, and D2 is allowed to vary between 0 and 1, however, zero duty cycle for D2 is to be avoided. During the buck mode of operation, D2 is equal to 1, which corresponds to an ON device.

Vcap equals the voltage across the ultracapacitor first and second terminals.

The above equation is derived from the condition that the average value of the voltage at the first node 70 between the first and second switches 56 and 58, respectively, V1, must equal the average value of the voltage at the second node 74 between the third and fourth switches 60 and 62, respectively, V2, in order to maintain zero average voltage across the inductor 64. From this condition, V1 equals V2.

where: $V1=D1*Vcap$ $V2=D2*Vo$

The value of D1 can vary from 0 to 1, and the value of D2 can vary from greater than 0 to 1. Instances where D2 equals 0 are avoided.

Based on the above equations, if D1 is greater than D2, then Vo is greater than Vcap, resulting in the switching module 52 providing a boosting operation. If D1 is less than D2, then Vo is smaller than Vcap, resulting in the switching module providing a bucking operation. If D1 equals D2, then Vo equals Vcap.

FIG. 6 is a block diagram of the power processing unit's control module 54, which includes a cascaded control architecture 76. The cascaded control architecture of the control module, includes an outer loop 78 that regulates the voltage output from the power processing unit 14, and an inner loop 80 that regulates the current passing through the inductor 64.

As shown in FIG. 6, the control module 54 includes a first adder 82, a voltage regulator 84, a second adder 86, a current regulator 88, and a pulse generator 90. A reference voltage, Vo_ref, is coupled into a first input 92 of the first adder. Vo_ref can be set internal to the control module, or externally by a user (not shown). The negative of Vo, the voltage across the energy pack's first and second terminals 48 and 50, respectively, is coupled into a second input 94 of the first adder. The value of Vo can be negated using an inverter (not shown). The first adder adds –Vo to Vo_ref, and the resulting sum, or voltage error, is coupled into the voltage regulator's input 96 from the first adder's output 98.

Figure 7:
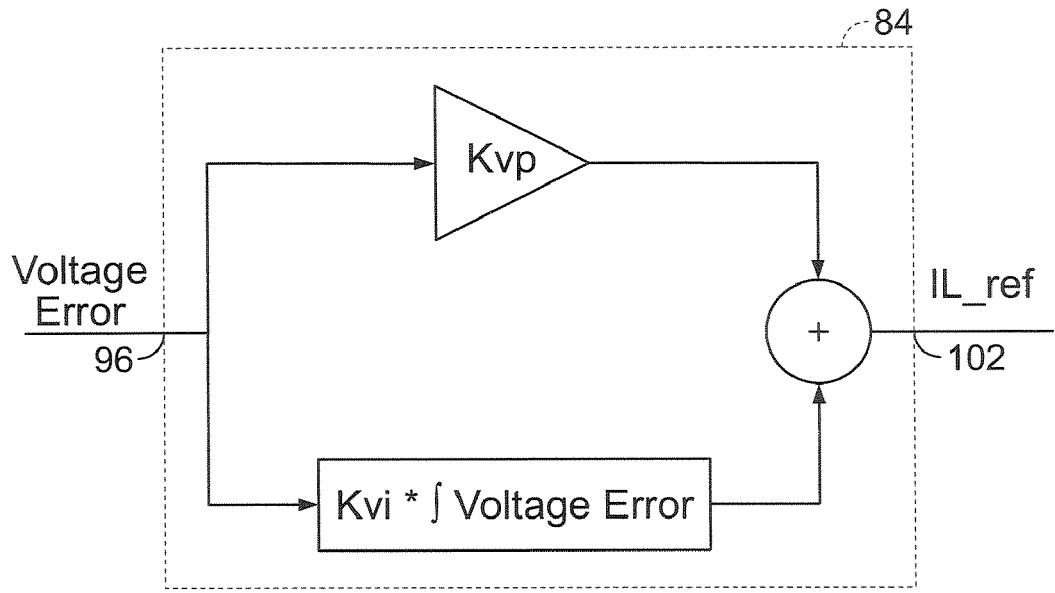
FIG. 7 is a block diagram of a voltage regulator included in the control module of FIG. 6.

The voltage regulator 84 generates a current reference voltage, IL_ref, based on the value of the voltage error, which is coupled into a first input 100 of the second adder 86 from the voltage regulator's output 102. A proportional-integral function is implemented in the voltage regulator, as shown in the block diagram of FIG. 7. The magnitude and the polarity of the current reference voltage is proportional to the voltage error. In particular, when the output voltage is less than the reference voltage, the current reference voltage is positive, resulting in a mode of operation where current flows from the ultracapacitors 12 to the load 17. On the other hand, when the output voltage is above the reference voltage, the current reference voltage is negative, resulting in a mode of operation where current flows into the ultracapacitors.

A voltage value, IL, that corresponds to the negative of the current flowing through the inductor 64 is coupled into a second input 104 of the second adder 86. The voltage value that corresponds to the current flowing through the inductor can be measured using a current probe (not shown), and can be negated using an inverter (not shown). The second adder then adds the voltage value IL_ref to the voltage value–IL, and the resulting sum, or current error, is coupled into the current regulator's input 106 from the second adder's output 108.

Figure 8:
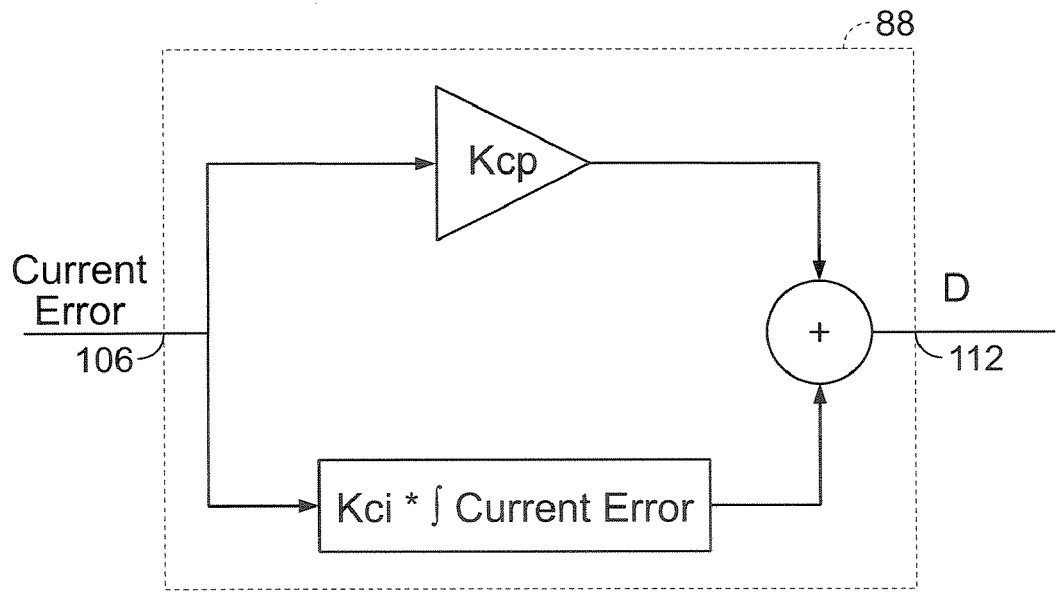
FIG. 8 is a block diagram of a current regulator included in the control module of FIG. 6.

The current regulator 88 generates an output, duty cycle, voltage signal, D, that is coupled into the input 1 10 of the pulse generator 90 from the current regulator's output 112. The current regulator generates the duty cycle signal D based on the value of the current error. A proportional-integral function is implemented in the current regulator, as shown in the block diagram of FIG. 8, which ensures that the current error is reduced virtually to zero. Thus, ensuring that the current reference voltage tracks the voltage value IL, which represents the actual current flowing through the inductor 64.

Figure 9:
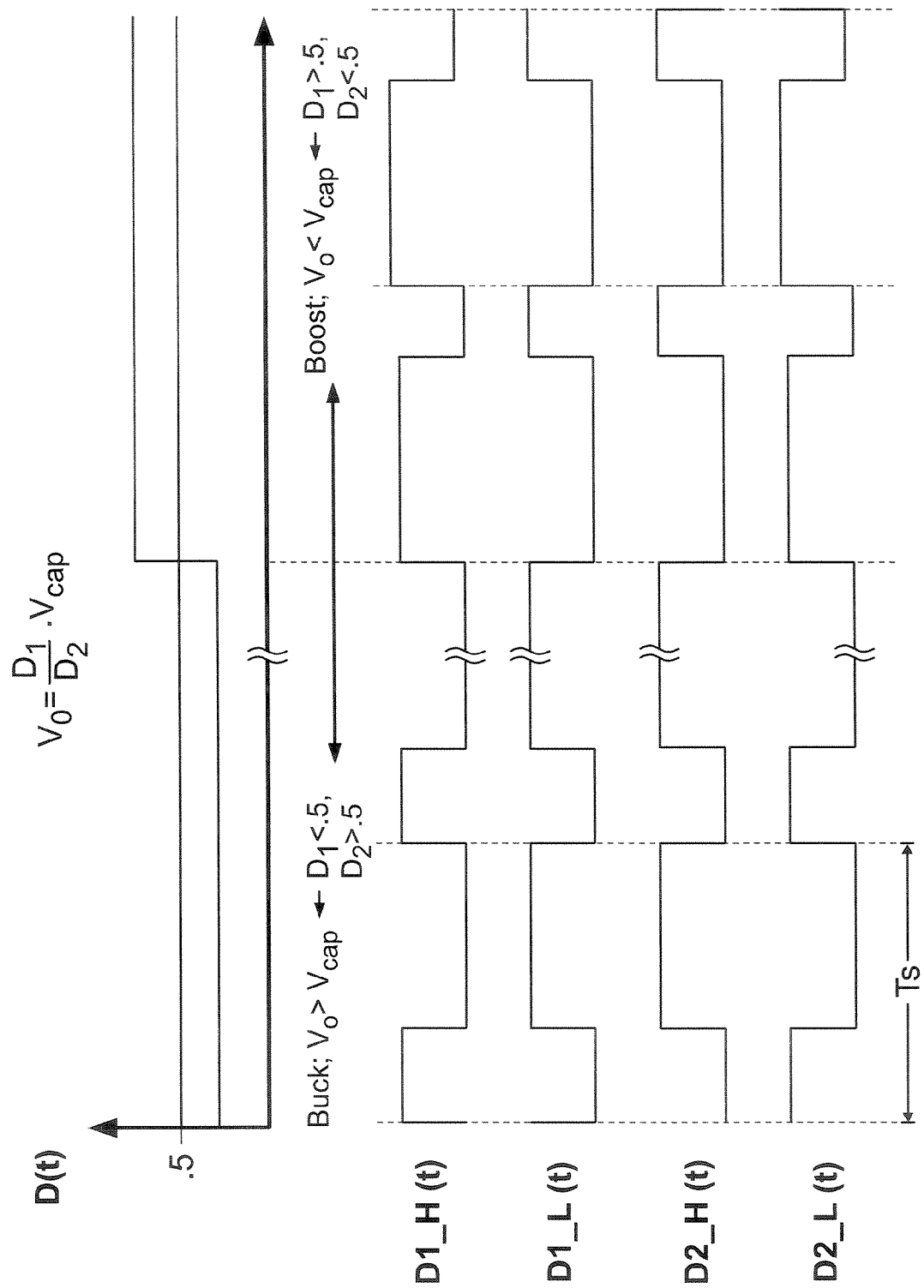
FIG. 9 is a timing diagram of a voltage signal input to, and voltage signals output from, a pulse generator included in the control module of FIG. 6.

The pulse generator 90, depending upon the value of D, generates at the pulse generator's first, second, third, and fourth outputs 114, 116, 118, and 120, respectively, the four switch control signals, D1_H, D1_L, D2_H, and D2_L, respectively, which are the voltage signals that control the duty cycle of the first, second, third, and fourth switches 56, 58, 60, and 62, respectively, as discussed above. FIG. 9 is a timing waveform diagram that illustrates example waveforms, as a function of time, for the voltage signals D1_H, D_L, D2_H, and D2_L as a function of the value of D. In FIG. 9, Ts is the period of the voltage signals D1_H, D1_L, D2_H, and D2_L.

The topology of the power processing unit's switching module 52 is different from conventional boost topologies, which require that the output voltage always be higher than the input voltage. The circuit topology shown in FIG. 5 is not restricted to such a limitation. This feature of the power processing unit 14 of the present invention ensures energy flow during discharge or charging of the ultracapacitor 12 regardless of the voltage, Vcap, across the ultracapacitor first and second terminals 44 and 46, respectively, and/or the voltage across the energy packs first and second terminals 48 and 50, respectively.

Referring again to FIGS. 2-4, the energy management unit 16 provides control, communication, diagnostics, and protection functions for the energy pack 10. More specifically, the energy management unit specifies the rate of charging and discharging of the ultracapacitors 12 in order to ensure proper operation and cycle life. Also, the energy management unit provides the ability to monitor the vital parameters such as the temperature of the electrical components included in the energy pack; the voltages across the ultracapacitor first and second terminals 44 and 46, respectively, and the energy pack first and second terminals 48 and 50, respectively; and the current flowing through the ultracapacitors. The energy management unit takes the necessary action to keep these vital parameters within the specified ranges for the device.

Thus, the energy management unit 16 maintains the desired state of charge of the ultracapacitors 12, and ensures a well balanced energy pack 10 is maintained, i.e., equal voltage values across all of the ultracapacitors. Depending upon the application, ultracapacitor balancing is achieved by using either a passive balancing resistor 20 across each ultracapacitor, or an active resistive element 36, which includes a resistor 38 and an active switch 40, to control the amount of power that is dissipated by the ultracapacitors, and thus, maintaining a good balance between the ultracapacitors.

In addition, the energy management unit 16 communicates with an external controller (not shown) for reporting and controlling purposes. The operation state of the energy pack 10, the voltage values across each of the ultracapacitors 12, and the temperatures of the ultracapacitors can be reported to the external controller via the energy management unit and the control module 54. The energy management unit limits the charging or discharging rates of the ultracapacitor, or the charging and discharging current limits, to ensure that the ultracapacitor voltage values do not exceed their maximum levels. A variety of communication protocols can be used to communicate with the energy pack based on market needs. The above functions of the energy management unit can be implemented digitally using a digital signal processor or a microcontroller 32, e.g., the ADSP401 manufactured by Analog Device located in Boston, Mass.

Advantageously, assuming the use of 10-15 Wh/kg ultracapacitors 12, the combination of the ultracapacitors, power processing unit 14, and energy management unit 16 provides for an overall, system, specific energy, e.g., from approximately 5-10 Wh/kg to approximately 10-20 Wh/kg, and relatively constant output voltage, Vo. Another advantage associated with the energy pack 10 is the energy pack's high cycle life, typically 50,000 to 100,000 cycles, in comparison to battery systems, which typically have cycle lives from 500 to 1,000 cycles.

Another advantage associated with the energy pack 10 is that the power processing unit 14 is bidirectional, thus, allowing for both the output of energy from the energy pack and the input of charging energy from an external power source (not shown). An additional advantage associated with the energy pack's power processing unit is that it provides filtering that results in a high quality dc output power, i.e., a dc output signal, Vo, having a maximum voltage ripple of less than approximately 0.5% of full scale, and maximum dc current ripple of less than approximately 0.5% of full scale. Also, the cascaded control architecture 76 of the power processing unit's control module 54 advantageously provides tight and fast-responding voltage regulation with an inherent current limiting capability.

Accordingly, the combination of the plurality of ultracapacitors 12, the power processing unit 14, and the energy management unit 16, results in an energy pack 10 having the following characteristics: high energy and power density, close to ideal terminal voltage and current characteristics, high reliability and low maintenance, and high cycle life.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. For example, capacitor types other than ultracapacitors 12 can be used in the present invention, as well as other energy storage devices that experience large voltage fluctuation, e.g., ±20%, during charging and discharging. Accordingly, the scope of the invention is defined only by the following claims.

What is claimed is:

1. A power processing unit configured to be coupled to an energy storage device, the energy storage device configured to deliver electrical energy to a load, and configured to receive electrical energy from a source, the power processing unit comprising:
   a. a switching module including:
      i. an inductor, and
      ii. a plurality of switches coupled to the inductor;
   b. a control module including a pulse generator that is coupled to the plurality of switches;
   c. a first terminal; and
   d. a second terminal;
   e. wherein the power processing unit is configured to regulate a voltage that corresponds to the voltage measured across the first and second terminals, the voltage being regulated to be at approximately a prescribed value despite a fluctuation in voltage across the energy storage device while electrical energy is received by the energy storage device, or while electrical energy is delivered from the energy storage device to the load.

2. The power processing unit according to claim 1, wherein the energy storage device is a capacitor.

3. The power processing unit according to claim 2, wherein the capacitor is an ultracapacitor.

4. The power processing unit according to claim 2, further comprising a dissipative element coupled in parallel with the capacitor.

5. The power processing unit according to claim 2, wherein:
   a. the capacitor includes a first lead and a second lead;
   c. the inductor includes a first lead and a second lead; and
   d. the plurality of switches includes:
      i. a first switch that is coupled between the inductor's first lead and the capacitor's first lead,
      ii. a second switch that is coupled between the inductor's first lead and the capacitor's second lead,
      iii. a third switch that is coupled between the inductor's second lead and the power processing unit's first terminal, and
      iv. a fourth switch that is coupled between the inductor's second lead and the power processing unit's second terminal.

6. The power processing unit according to claim 5, wherein:
   a. the control module further includes:
      i. a first adder having a first input, a second input, and an output;
      ii. a voltage regulator having an input that is coupled to the first adder's output, and an output;
      iii. a second adder having a first input that is coupled to the voltage regulator's output, a second input, and an output; and
      iv. a current regulator having an input that is coupled to the second adder's output, and an output; and
   b. the pulse generator has an input that is coupled to the current regulator's output, and a first output, second output, third output, and fourth output.

7. The power processing unit according to claim 6, wherein:
   a. a reference voltage is coupled into the first adder's first input;
   b. the voltage that corresponds to the voltage measured across the power processing unit's first and second terminals is coupled into the first adder's second input; and
   c. a voltage that corresponds to an amount of current flowing through the inductor is coupled into the second adder's second input.

8. The power processing unit according to claim 6, wherein:
   a. the pulse generator's first output is coupled to the first switch;
   b. the pulse generator's second output is coupled to the second switch;
   c. the pulse generator's third output is coupled to the third switch; and
   d. the pulse generator's fourth output is coupled to the fourth switch.

9. The power processing unit according to claim 8, wherein:
   a. the pulse generator generates a switch control signal that is coupled into one switch of the first, second, third, and fourth switches; and
   b. the switch control signal enables the flow of a current through the one switch.

10. A method for regulating a voltage, the method comprising:
   a. providing an energy storage device;
   b. providing a power processing unit coupled to the energy storage device, the power processing unit including
      i. a switching module that is coupled to the energy storage device and includes a plurality of switches,
      ii. a control module that is coupled to the switching module,
      iii. a first terminal, and
      iv. a second terminal;
   c. using the control module to generate a switch control signal;
   d. coupling the switch control signal into one of the plurality of switches; and
   e. using the switch control signal to control the one of the plurality of switches so that a voltage that corresponds to the voltage measured across the first and second terminals is regulated to be at approximately a prescribed value despite a fluctuation in voltage across the energy storage device as electrical energy is received by the energy storage device, or as electrical energy is delivered from the energy storage device to a load.

11. The method according to claim 10, wherein the energy storage device is a capacitor.

12. The method according to claim 11, wherein the capacitor is an ultracapacitor.

13. The method according to claim 11, further comprising providing a dissipative element coupled in parallel with the capacitor.

14. The method according to claim 11, wherein:
   a. the capacitor includes a first lead and a second lead;
   b. the switching module includes an inductor having a first lead and a second lead; and
   c. the plurality of switches includes:
      i. a first switch that is coupled between the inductor's first lead and the capacitor's first lead,
      ii. a second switch that is coupled between the inductor's first lead and the capacitor's second lead,
      iii. a third switch that is coupled between the inductor's second lead and the power processing unit's first terminal, and
      iv. a fourth switch that is coupled between the inductor's second lead and the power processing unit's second terminal.

15. The method according to claim 14, wherein the control module includes:
   a. a first adder having a first input, a second input, and an output;
   b. a voltage regulator having an input that is coupled to the first adder's output, and an output;
   c. a second adder having a first input that is coupled to the voltage regulator's output, a second input, and an output;
   d. a current regulator having an input that is coupled to the second adder's output, and an output; and
   e. a pulse generator having an input that is coupled to the current regulator's output, and a first output, second output, third output, and fourth output.

16. The method according to claim 15, wherein:
   a. a reference voltage is coupled into the first adder's first input;
   b. the voltage that corresponds to the voltage measured across the power processing unit's first and second terminals is coupled into the first adder's second input; and
   c. a voltage that corresponds to an amount of current flowing through the inductor is coupled into the second adder's second input.

17. The method according to claim 15, wherein:
   a. the pulse generator's first output is coupled to the first switch;
   b. the pulse generator's second output is coupled to the second switch;
   c. the pulse generator's third output is coupled to the third switch; and
   d. the pulse generator's fourth output is coupled to the fourth switch.

18. A power processing unit configured to control a fluctuation in voltage across a capacitor having a first lead and a second lead as electrical energy is received by the capacitor, or as electrical energy is delivered from the capacitor to a load, the power processing unit comprising:
   a. a switching module including:
      i. an inductor having a first lead and a second lead, and
      ii. a plurality of switches coupled to the inductor;
   b. a control module including a pulse generator that is coupled to the plurality of switches;
   c. a first terminal; and
   d. a second terminal;
   e. wherein the plurality of switches includes:
      i. a first switch that is coupled between the inductor's first lead and the capacitor's first lead,
      ii. a second switch that is coupled between the inductor's first lead and the capacitor's second lead,
      iii. a third switch that is coupled between the inductor's second lead and the power processing unit's first terminal, and
      iv. a fourth switch that is coupled between the inductor's second lead and the power processing unit's second terminal.

19. The power processing unit according to claim 18, wherein:
   a. the control module further includes:
      i. a first adder having a first input, a second input, and an output;
      ii. a voltage regulator having an input that is coupled to the first adder's output, and an output;
      iii. a second adder having a first input that is coupled to the voltage regulator's output, a second input, and an output; and
      iv. a current regulator having an input that is coupled to the second adder's output, and an output; and
   b. the pulse generator has an input that is coupled to the current regulator's output, and a first output, second output, third output, and fourth output.

20. The power processing unit according to claim 19, wherein:
   a. a reference voltage is coupled into the first adder's first input;
   b. a voltage that corresponds to a voltage measured across the power processing unit's first and second terminals is coupled into the first adder's second input; and
   c. a voltage that corresponds to an amount of current flowing through the inductor is coupled into the second adder's second input.

21. The power processing unit according to claim 19, wherein:
   a. the pulse generator's first output is coupled to the first switch;
   b. the pulse generator's second output is coupled to the second switch;
   c. the pulse generator's third output is coupled to the third switch; and
   d. the pulse generator's fourth output is coupled to the fourth switch.

22. The power processing unit according to claim 21, wherein:
   a. the pulse generator generates a switch control signal that is coupled into one switch of the first, second, third, and fourth switches; and
   b. the switch control signal enables the flow of a current through the one switch.

* * * * *

UNITED STATES PATENT AND TRADEMARK OFFICE
CERTIFICATE OF CORRECTION

PATENT NO. : 7,492,130 B2  
APPLICATION NO. : 11/853664  
DATED : February 17, 2009  
INVENTOR(S) : Zaher Daboussi Page 1 of 1

It is certified that error appears in the above-identified patent and that said Letters Patent is hereby corrected as shown below:

Detailed Description of the Preferred Embodiments

Column 6, Line 24 change "D_L" to "D1_L"  
Column 7, Line 64 change "value-IL" to "value -IL"  
Column 8, Line 2 change "1 10" to "110"  
Column 8, Line 20 change "D_L" to "D1_L"

Claims

Column 10, Line 13, change "c." to "b."  
Column 10, Line 14, change "d." to "c."

Signed and Sealed this

Twenty-third Day of June, 2009

JOHN DOLL  
*Acting Director of the United States Patent and Trademark Office*